H. Schulte.
Curtain Fixture.
№ 88,671. Patented Apr. 6, 1869.
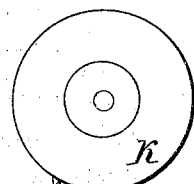
Fig. 1
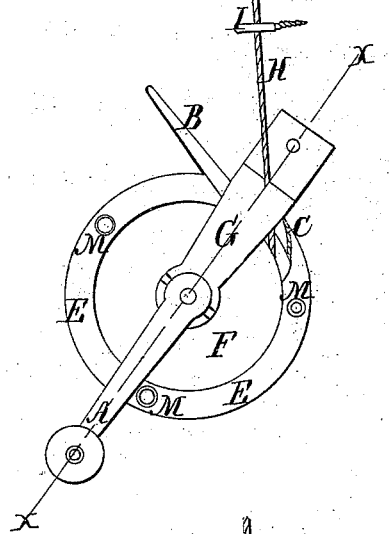
Fig. 2
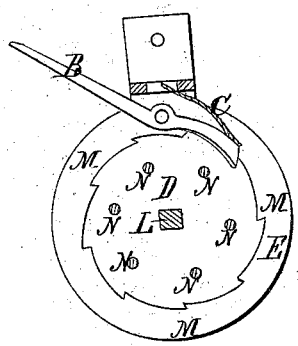
Fig. 3
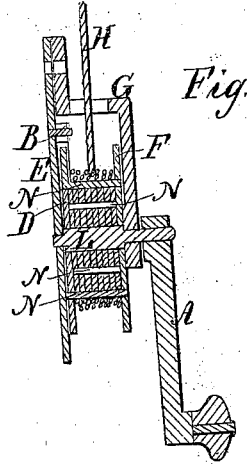
Witnesses
Inventor
Hermann Schulte

United States Patent Office.

HERMANN SCHULTE, OF MILWAUKEE, WISCONSIN.

Letters Patent No. 88,671, dated April 6, 1869.

IMPROVED WINDOW-SHADE FIXTURE.

The Schedule referred to in these Letters Patent and making part of the same.

*To all whom it may concern:*

Be it known that I, HERMANN SCHULTE, of the city and county of Milwaukee, and State of Wisconsin, have invented a new and useful Improvement in Window-Shade Fixtures; and I do hereby declare that the following is a full, clear, and exact description thereof, which will enable those skilled in the art to make and use the same, reference being had to the accompanying drawing, forming part of this specification, in which—

Figure 1 is a view of the fixture as ready for use.
Figure 2, a sectional view.
Figure 3, a sectional view in the line $x\, x$, fig. 1.

Similar letters of reference in each of the figures indicate corresponding parts.

My invention consists in the construction of an apparatus for raising and lowering large window-shades, and holding them at any point, and keeping them firmly in place.

A is the crank, to wind up and unwind the cord that raises and lowers the shade.

B, a lever-catch, which holds the reel from unwinding.

C, spring, which presses against lever-catch B, and holds it in place.

D, ratchet-head of the reel which winds up the cord.

E, inner plate, and support of the apparatus.

F, the outer head of the reel.

G, frame-piece, which holds the winding-apparatus together.

H, cord.

I, screw, with a ring-head, to be screwed into the side of the window, for the cord to run through, and be kept in place.

K, the upper reel, to be fastened on the end of a roller, around which the shade will be rolled.

L, crank-shaft, for the operating-reel.

M, screw-holes, to fasten the apparatus in position.

N, shafts of the reel, holding the two heads together, and around which the cord is wound.

Operation.

Fasten reel K to the roller which is to hold the shade; then screw the screw I into the side of the window; then fasten the lower part of fig. 1 to the side of the window, the crank out, and pass the cord through the eye of screw I, and fasten the end to reel K. The shade being rolled clear up on the roller, then press on the handle of lever B, raising its point out of the notches in the rack. Then pull down the shade; that will wind the cord around the reel K, and unwind it from the crank-reel.

To raise the shade again, wind on crank A, leaving lever B to take care of itself; and, when you have raised the shade to the desired height, let it stand.

What I claim as my invention, and desire to secure by Letters Patent, is—

A window-shade fixture, consisting of crank A, lever-latch B, spring C, reel D E, cord H, and reel K, with frame G and shaft L, combined and arranged substantially as described.

HERMANN SCHULTE.

Witnesses:
J. B. SMITH,
W. S. TROWBRIDGE.